UNITED STATES PATENT OFFICE.

THOMAS P. MILLIGAN, OF SOUTH ORANGE, NEW JERSEY.

GELATINIZED PELT.

SPECIFICATION forming part of Letters Patent No. 333,964, dated January 5, 1886.

Application filed October 15, 1885. Serial No. 179,981. (Specimens.)

*To all whom it may concern:*

Be it known that I, THOMAS P. MILLIGAN, a citizen of the United States, residing in South Orange, in the county of Essex and State of New Jersey, have invented certain new and useful Improvements in Gelatinized Pelts, of which the following is a specification.

My invention relates to an improvement in the manufacture of gelatine; and its object is to prepare from the skins of small animals an article of sale suitable and convenient for storage and preservation, and from which a superior quality of gelatine can at any time be easily produced.

In Letters Patent No. 246,182, issued to me August 23, 1881, for the joint invention of Isaiah Dennis and myself, there is described a method of treating the skins of small animals and producing gelatine therefrom.

My present invention consists in an improvement on the process described in said patent, the material being differently treated at one stage, whereby a new article of manufacture is produced.

The class of skins to which my invention especially relates are those generally of the cony, rabbit, hare, nutria, musk-rat, and similar small animals whose fur is used principally in the manufacture of hats.

In order to remove the fur the pelts are shredded into narrow strips having been treated with nitrate of mercury, or "caroted," as it is generally termed. A large amount of acid remains in the pelts after the removal of the fur, and for this reason, until the invention set forth in the above Letters Patent, they have never been used in the manufacture of gelatine, which requires to be perfectly clear and free from foreign substances.

In order to remove the foreign substances the skins are first thoroughly washed in water, about four hundred gallons of water to two hundred and fifty pounds of the shredded stock being sufficient. The water both washes and softens the skins, and after it is drained off some two hundred gallons of water is poured onto them. A solution of five pounds of soda and ten ounces of lime in two and a half gallons of water is then added and mixed with the skins and water. This causes them to be very much swollen and softened. The soda is permitted to act upon them as long as they will bear the treatment without dissolving or disintegration, the time varying from twenty to sixty minutes with different kinds of stock. The whole solution is then drawn off and the skins thoroughly washed with three or four hundred gallons of clear water to remove the soda. After again draining them they are hardened by adding two or three hundred gallons of water containing about five pounds of alum in solution. This contracts the stock and prepares them, according to the process described in the aforesaid Letters Patent, for the production of the gelatine by boiling. Up to this point the stock may properly be considered as pelt cleansed from its impurities ready to be changed to gelatine, which has heretofore been done by the process of boiling; and it is at this point in the process that I change the treatment, whereby the product is greatly improved in quality. Heat injures the quality of gelatine, and it is desirable to produce it with the least application of this element.

Instead of boiling the stock after it is hardened by the application of the alum, I remove it from the tank and allow it to come in contact with the atmosphere until it is thoroughly dry. In warm dry weather it is generally sufficient to effect the result desired. At other times it should be dried in a room having the air raised to a moderate temperature, preferably not exceeding 120°. The result is that the stock is partially gelatinized by drying it at this stage, and so changed that a very moderate heat afterward in the water bath will complete the manufacture. Further than this, the stock thus dried in the air will remain unchanged in any climate, may be stored conveniently, and forms a desirable article of trade, inasmuch as it is very easy and cheap, requiring no special skill to produce the gelatine from it at any time afterward, while, on account of my new treatment, whereby less heat is applied, the product is better than could be produced by the usual methods.

The above process is calculated to produce the best results; but it may be varied according to the kind of stock operated upon and the quality of product required. Other alkalies than soda may be employed in the process, provided they are essentially equivalents in their action.

The new feature is the new result produced by subjecting the stock at the proper stage to the action of the atmosphere. At that stage it is in a condition to be partially gelatinized at a low temperature, and when so partially gelatinized it forms a convenient and desirable article to the trade. It is desirable, because, being dry, it will keep in all climates, and because a superior quality of gelatine can be produced easily and readily at will; and the article is superior because less heat is required in the final water bath. The reason why the atmosphere has the effect of partially gelatinizing the stock is because the latter is cut or shredded in fine strips, which permits a large surface to be exposed to its action. It is evident that it would not have such effect upon whole skins or large pieces.

I claim as my invention—

1. The hereinbefore-described process of producing gelatinized or partially-gelatinized pelts, which consists in, first, subjecting the pelts to the action of an alkaline bath, removing the alkali by washing, then in immersing them in a solution of alum, and, finally, placing them in a warm atmosphere, whereby they are both dried and partially gelatinized.

2. As a new article of manufacture, dry gelatinized or partially-gelatinized pelts, substantially as described.

In testimony whereof I have hereunto subscribed my name this 13th day of October, A. D. 1885.

THOMAS P. MILLIGAN.

Witnesses:
DANL. W. EDGECOMB,
CHARLES A. TERRY.